United States Patent [19]

Cavagnero et al.

[11] Patent Number: 4,488,825
[45] Date of Patent: Dec. 18, 1984

[54] MOTOR BEARING AND SEAL ASSEMBLY

[75] Inventors: Erman V. Cavagnero; George A. English; Charles R. Marracino, all of Torrington, Conn.

[73] Assignee: Clevepak Corporation, White Plains, N.Y.

[21] Appl. No.: 565,985

[22] Filed: Dec. 27, 1983

Related U.S. Application Data

[62] Division of Ser. No. 353,395, Mar. 1, 1982, Pat. No. 4,458,405.

[51] Int. Cl.³ .............................................. F16C 17/02
[52] U.S. Cl. ...................................... 384/152; 384/276
[58] Field of Search ............. 384/152, 153, 151, 279, 384/289, 286, 276, 381

[56] References Cited

U.S. PATENT DOCUMENTS

| | | | |
|---|---|---|---|
| 2,926,968 | 3/1960 | Toth | 384/381 |
| 3,074,768 | 1/1963 | Abel | 384/279 |
| 3,614,261 | 10/1971 | Friese | 416/174 |
| 4,093,323 | 6/1978 | Quandt et al. | 384/279 |

*Primary Examiner*—Lenard A. Footland
*Attorney, Agent, or Firm*—McCormick, Paulding & Huber

[57] ABSTRACT

A bearing and seal assembly for use in an electric motor rotor or stator bore about a central shaft. The bearing and seal assembly comprises a drawn aluminum sleeve disposed in and secured to the wall of the bore and having opposite end portions projecting beyond the bore wall. A sleeve bearing is press fit in the sleeve with the sleeve press fit or adhesively secured in the bore. An annular seal is press fit in one projecting end portion of the sleeve and is thus held in precise coaxial relationship with the bearing. The opposite projecting end portion of the sleeve provides a seat for an O-ring at a diametrically enlarged portion thereof. A cap in snap engagement with the rotor or stator, or alternatively with the sleeve, engages the O-ring and closes a lubricant chamber surrounding the bearing and within the sleeve. The assembly method includes press fitting of the bearing and seal in the sleeve with the elements mounted on an assembly pin for precise concentricity or coaxial relationship. Alternatively, the sleeve may be press fit in the rotor or stator bore or adhesively secured therein.

9 Claims, 10 Drawing Figures

MOTOR BEARING AND SEAL ASSEMBLY

This application is a division of application Ser. No. 353,395, filed Mar. 1, 1982, now U.S. Pat. No. 4,458,405.

BACKGROUND OF THE INVENTION

This invention relates to small electric motors of the type used in axial flow air impeller units commonly found in computers, copy machines etc. More particularly, the invention relates to an improved bearing and seal assembly for use about a central shaft and within a stator or rotor of such a motor. The bearing and seal assembly in a motor of this type must be of a relatively simple and inexpensive construction and yet highly efficient and dependable in use throughout the substantial life span of the unit.

In U.S. Pat. No. 3,614,261 entitled BEARING SEAL MEANS FOR AN ELECTRICALLY DRIVEN FAN issued Oct. 19, 1971 to Karl E. Friese et al, a bearing and seal assembly is disclosed with a sleeve bearing disposed within a ferrule or sleeve which provides a capillary sealing function at one end and which is enlarged and closed at an opposite end to provide a lubricant chamber about the bearing. The ferrule or sleeve is, however, of relatively heavy and expensive construction and the capillary sealing function is provided by a cup-shaped projecting end portion of the sleeve and an associated annular felt ring. Close tolerances and precise concentricity or coaxial relationship between the sleeve bearing and the portion of the sleeve providing the capillary seal are of course desired but have been found somewhat difficult to achieve and the construction has also been found deficient in this regard.

It is the general object of the present invention to provide a bearing and seal assembly which includes a bearing and seal confining sleeve and which provides for the necessary close tolerances, precise concentricity or coaxial relationship of elements, and which is yet of a desirably simple and inexpensive construction yielding a high degree of efficiency and dependability in use.

A further object of the invention resides in the provision of an assembly method whereby the sleeve receives the bearing and seal in press fit engagement and precisely centers the elements about an assembly pin with the sleeve press fit or adhesively secured within the bore of a motor stator or rotor.

SUMMARY OF THE INVENTION

In fulfillment of the foregoing objects and in accordance with the present invention, a soft deformable and smooth thin walled sleeve is provided and is preferably of drawn aluminum. Press fitting of a sleeve bearing and an annular seal while mounted on an assembly pin is readily accomodated by the smooth walled and deformable sleeve and the elements are precisely centered and located by the assembly pin. The sleeve may be simultaneously urged into press fit engagement with the wall of the bore in a stator or rotor or, alternatively, the sleeve may be adhesively secured in the bore. The desired precise concentricity or coaxial relationship of elements is thus readily achieved in a simple and inexpensive assembly procedure and efficient and long service life results.

In final assembly the thin walled sleeve resides in the bore of the annular element comprising a stator or rotor with one end portion thereof peripherally unrestrained e.g. projecting beyond the wall of the bore and confining the annular seal. The seal has an internal diameter in close tolerance relationship with an associated shaft to provide the desired capillary action and lubricant grooves are provided between the seal and the adjacent sleeve bearing. The bearing also preferably includes axial lubricant grooves along its peripheral surface and an opposite end portion of the sleeve of enlarged diameter seats an O-ring which engages an annular flange on a closure member or cap whereby to define a lubricant chamber about the bearing and within the sleeve. Thus, the sleeve provides for the necessary close tolerance relationship between bearing and shaft and seal and shaft and for precise concentricity or coaxial relationship between bearing and seal and also provides an oil or lubricant chamber about the bearing and an associated portion of a central shaft within the bearing.

In practicing the assembly method of the invention, the sleeve bearing and annular seal are arranged in end-to-end relationship on an assembly pin which has precisely coaxial adjacent diameters substantially equal respectively to the desired final internal diameters of the bearing and the seal. A drawn aluminum or otherwise soft deformable and smooth thin walled sleeve is provided with an external diameter slightly smaller than the bore in a major annular motor element which may be a stator or rotor. The internal diameter of the thin walled sleeve is slightly smaller than the external diameter of the sleeve bearing and the seal. The assembly pin with the bearing and seal thereon, the sleeve, and the annular motor element are axially aligned for precise coaxial movement of the pin relative to the bore in the annular element. When the sleeve is to be secured within the bore by a press fit engagement, the sleeve is first disposed in the bore, and the bearing and seal are then urged axially into the sleeve. Alternatively, when the sleeve is to be secured in the bore adhesively, the sleeve is aligned axially as described but is positioned externally of the bore for press fitting of the bearing and seal therewithin. The assembled sleeve, bearing, and seal are then moved axially into the bore for adhesive retention therein. In either event, the sleeve readily accomodates press fitting of the bearing and seal therewithin while the assembly pin provides for the precise location of the bearing and seal thereon.

When the sleeve is disposed in the bore of the annular element so as to be simultaneously press fit therein during the press fitting operation of the bearing and seal within the sleeve, the sleeve bearing is preferably compressed during axial movement into the sleeve and a slight reduction of its internal diameter occurs about the assembly pin. Thus, the sleeve bearing is precisely sized about the pin during the press fitting operation. The annular seal is press fit within a projecting end portion of the sleeve beyond the wall of the bore of the annular element and is retained in precise concentricity or coaxial relationship with the bearing with the free end portion of the sleeve expanding or otherwise deforming as required to accomodate any non-concentricity encountered. Thus, the assembly pin remains in dimensional control at all times and the precise concentricity or coaxial relationship of bearing and seal is readily assured.

Press fitting of the sleeve in the bore of the annular element is provided for by slightly oversizing the external diameter of the bearing and secure retention of the assembly within the bore is achieved. Irregularities in the bore wall, which may derive from a laminated construction of the annular element, serve to further enhance retention of the sleeve in the bore. During press fitting of the bearing and seal within the sleeve and resulting press fitting of the sleeve, the soft deformable material of the sleeve at least partially enters depressions in the bore wall and the sleeve is thus positively secured against axial movement relative to the bore wall.

When the sleeve is adhesively secured in the bore of the annular element, the through openings in the sleeve bearing and the annular seal are precisely dimensioned or sized during manufacture and such dimensions are retained with the elements mounted on the assembly pin during press fitting within the sleeve. Expansion or other deformation of the sleeve accomodates any nonconcentricity and precise concentricity or coaxial relationship of the elements is maintained. On entry of the assembled sleeve, bearing and seal into the bore with the assembly pin within the bearing and seal, the previously established conditions are further maintained for the desired final relationship of the elements of the assembly. Adhesive retention of the assembly in the bore may be provided for by a preceeding application of adhesive to the external surface of the sleeve.

DESCRIPTION OF PREFERRED EMBODIMENTS

Figure 1:
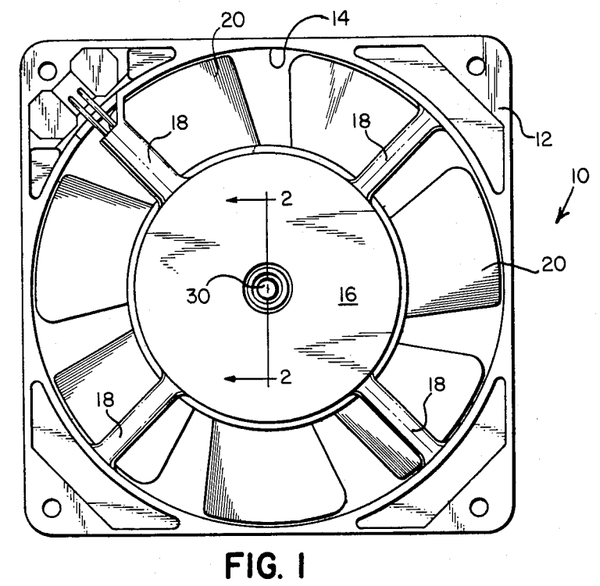
FIG. 1 is an elevational view of an electric motor driven axial flow air impeller with a motor which includes the improved bearing and seal assembly of the present invention.
Figure 2:
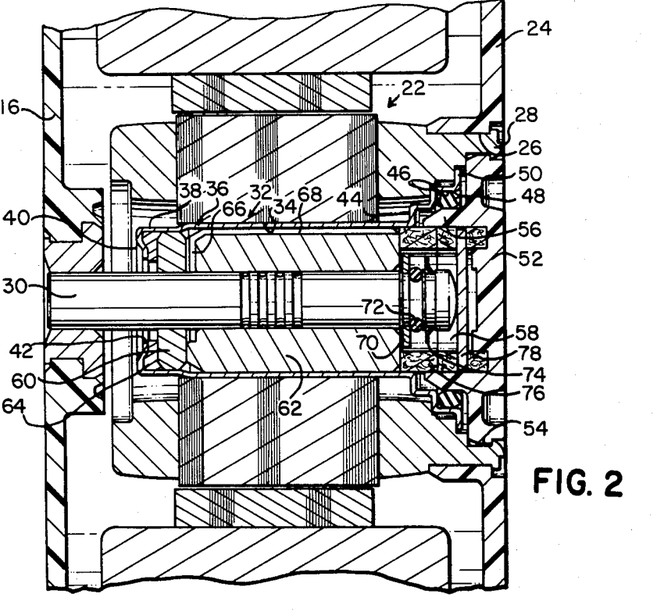
FIG. 2 is an enlarged fragmentary vertical section through the motor taken generally as indicated at 2,2 in FIG. 1 and illustrating the improved bearing and seal assembly.

Referring particularly to FIGS. 1 and 2, it will be observed that a small electric motor driven axial flow air impeller, indicated generally at 10, has a generally rectangular housing 12 which defines an axial air passageway 14 and which includes a central housing portion 16 supported by circumaxially spaced radial struts 18,18. The central housing portion 16 contains the small electric motor which drives a plurality of fan blades 20,20 for impelling an axial flow of air through the passageway 14. As best illustrated in FIG. 2, the electric motor has a rotor, indicated generally at 22, which is connected in driving relationship with a cup-shaped member 24, partially shown, and which at its periphery carries the air moving blades 20,20. The rotor 22 may be connected with the cup-shaped member 24 at a central circular opening 26 in the member as by peening or staking of a rotor flange at 28.

At a left-hand portion of FIG. 2, the inner or central housing portion 16 mounts a motor shaft 30 in cantilever fashion, the shaft extending rightwardly in FIG. 2 and having an associated bearing and seal assembly indicated generally at 32. The bearing and seal assembly 32 embodies the present invention.

The shaft 30 is stationary as disclosed in FIG. 2 with the bearing and seal assembly 32 and the rotor 22 rotatable thereabout. It will be apparent, however, that relative rotation is the essence and that a rotating shaft and a stationary bearing and seal assembly within a stator falls within the scope of the present invention. Thus, the improved bearing and seal assembly of the invention is usable with a major annular element of an electric motor or the like whether the annular element comprises a rotor, a stator, or other motor element.

Whether stationary or rotary, the annular element 22 is provided with a centrally located through bore 34 and the improved bearing and seal assembly of the present invention is fixedly mounted therein. In accordance with the invention, a soft deformable and smooth thin walled sleeve is disposed in and secured to the wall of the bore such as 34. As shown, such a sleeve is illustrated at 36 in FIG. 2 and is of drawn aluminum, manufactured for example by eyelet machine or the eyelet process, and has a smooth surfaced thin side wall well suited to the press fitting operations of the present invention. The aluminum used in the construction of the sleeve 36 is identified by the Aluminum Association as number 3005 Aluminum and, as an illustrative example, the thickness of the wall of the sleeve is 0.0135 to 0.0145 inches. The internal diameter of the sleeve 36 is nominally 0.463 inches prior to assembly in a press fit operation to be described hereinbelow.

The sleeve 36 has a left-hand projecting end portion 38 of slightly reduced diameter and a radially inwardly projecting flange 40 is integrally formed with the sleeve and has a central opening 42 in spaced relationship with the shaft 30. The main or body portion of the sleeve 36 resides within the bore 34 with the portion 38 projecting leftwardly from the wall of the bore and with a right-hand end portion 44 of the sleeve projecting rightwardly from the wall of the bore 34. That is, the right-hand end portion 44 of the sleeve 36 is enlarged diametrically to provide an annular seat at 46 for an O-ring 48. A radially outwardly projecting strengthening flange 50 is integrally formed at an extreme right-hand end portion of the sleeve 36 and may seat against a radial surface on the rotor 22. Thus, a closure member or end cap may be provided as at 52 for snap engagement in an end opening 54 in the rotor 22 to engage the O-ring at an annular flanged portion 56 and to thus provide an oil or lubricant chamber 58 within the sleeve 36.

The oil or lubricant chamber 58 is defined by the sleeve 36, O-ring 48, end cap 52, and a seal 60 disposed within the reduced diameter and leftwardly projecting end portion 38 of the sleeve. Thus, the chamber 58 resides about a sleeve bearing 62 and a right-hand portion of the shaft 30 and provides for the desired lubrication of the bearing and shaft.

The left-hand end of the oil or lubricant chamber 58 is defined by annular seal 60 as stated and by a small gasket 64 disposed between the seal 60 and the and flange 40 on the sleeve 36. That is, the space between the annular seal 60 and the shaft 30 is so limited as to prevent the axial outward flow of oil or other lubricant leftwardly past the seal and, in the embodiment shown, the said space or clearance is nominally 0.004 inches. A capillary action is thus provided for and, rather than flowing leftwardly beyond the seal, oil or other lubricant is thrown radially outwardly between the seal 60 and the bearing 62 as provided for by space 66. The space 66 may represent a plurality of radial grooves in the end surface of the bearing 62 communicating with axially extending grooves 68,68, one shown, along the periphery of the bearing. The gasket 64 prevents the leakage of oil or other lubricant leftwardly around the outer or peripheral surface of the annular seal 60. The gasket may be of a soft conventional material and the end seal 60 may be similarly constructed in a conventional manner as from sintered iron.

The sleeve bearing 62 may also be conventional and may, for example, be of sintered bronze with substantial void or air space for the absorbtion of oil or other lubricant. Thus, the oil or other lubricant permeates the bearing 62 and provides for oil film rotational contact between the shaft 30 and bearing 62 within the oil or lubricant chamber 58, the enlarged right-hand end portion of the chamber serving as an oil or lubricant sump.

At its right-hand end portion, the shaft 30 carries a washer 70, O-ring 72, and snap ring 74, all in a conventional manner. Annular felt members may be provided at 76 and a conventional thrust element 78 engages an arcuate end portion of the shaft 30.

Figure 4:
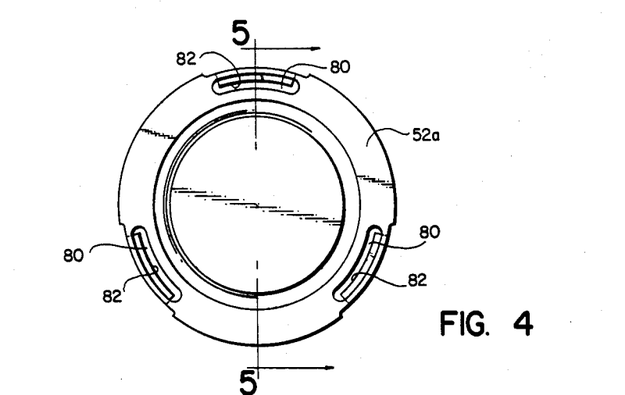
FIG. 4 is an elevational view of an alternative end cap for a lubricant chamber within the motor.
Figure 5:
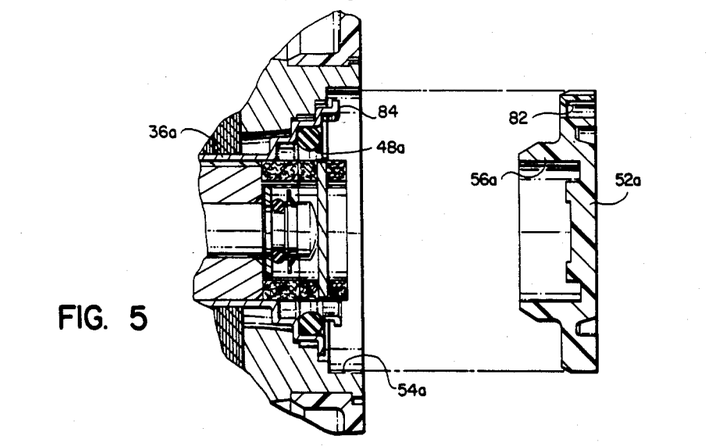
FIG. 5 is a fragmentary section through the end cap of FIG. 4 as indicated generally at 5,5 and through an end portion of the electric motor, the end cap being illustrated in an exploded and disassembled position.

In FIGS. 4 and 5, an alternative end cap arrangement is illustrated and may include an end cap 52a having a plurality of axial openings 80,80, three shown, each with a small seat 82, formed therein. The openings 80,80 are adapted to respectively receive a plurality of small hook members 84,84, one shown, formed integrally on and projecting rightwardly from the sleeve 36. With the cap 52a moved leftwardly as indicated by phantom line in FIG. 5 and entered in rotor opening 54a, the small hook members 84,84 flex inwardly and thereafter engage the seats 82,82 whereby to secure the cap in its assembled position. Annular flange 56a on the cap engages O-ring 48a in sealing relationship as in the case of the flange 56 and O-ring 48 in FIG. 2.

As is well known, the efficiency and long life of a lubrication system such as described is dependent upon the maintenance of close tolerances and dimensional relationships between shaft and bearing and shaft and seal and upon precise concentricity or precise coaxial relationship between a bearing and its associated seal. The establishment and maintenance of the desired conditions is greatly facilitated in the present invention with the use of the specific drawn aluminum sleeve 36 and with the assembly method of the invention involving the mounting of the bearing and seal on an assembly pin and the subsequent press fitting of the bearing and seal within the sleeve.

Figure 6:
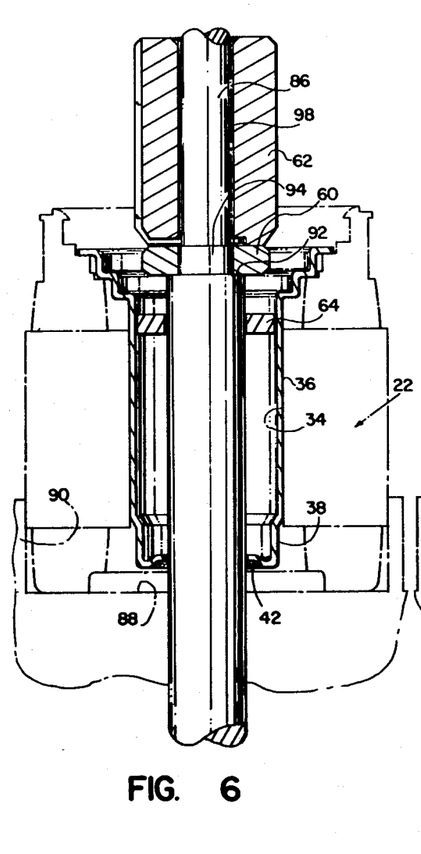
FIG. 6 is a somewhat schematic vertical section through a rotor of the electric motor, a sleeve, bearing, seal, and gasket of the bearing assembly, the various elements being illustrated in an initial position of assembly with the bearing, seal, and gasket mounted on an assembly pin.
Figure 7:
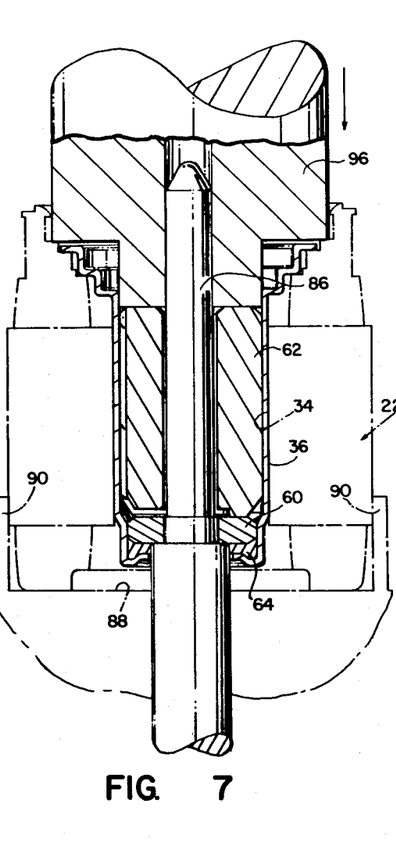
FIG. 7 is a somewhat schematic view similar to FIG. 6 but showing the various elements of the bearing and seal assembly in an assembled arrangement within the bore of the rotor.
Figure 8:
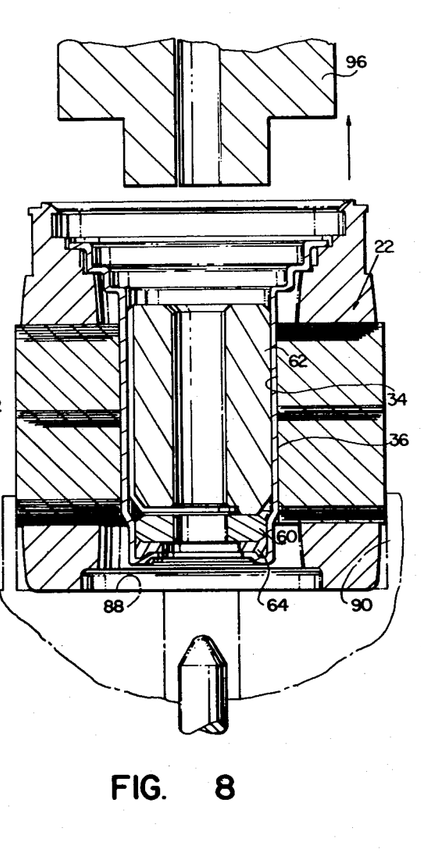
FIG. 8 is a further somewhat schematic view similar to FIGS. 6 and 7 but showing the assembly pin in a position of withdrawal and a ram member in a position of withdrawal.

A first form of the method of the invention is illustrated in FIGS. 6–8 and involves the step of aligning the bearing, seal, shell, and rotor or other annular element with the bearing and seal mounted on an assembly pin such as illustrated at 86. In FIGS. 6–8 the rotor or other annular element 22 is supported by a base member 88 and loosely positioned by an annular member 90 with sleeve 36 loosely entered in the bore 34 of the annular member. Thus, the sleeve 36 has an external diameter slightly smaller than the internal diameter of the bore 34 and the internal diameter of the sleeve 36 is slightly smaller than the external diameter of the sleeve bearing 62. In the FIGS. 6–8 embodiment of the method, and when a press fit of the sleeve 36 in the bore 34 is desired, a 0.494 inch diameter bore may be provided with a sleeve dimensioned as above. That is, a sleeve having a nominal 0.014 inch wall thickness and a 0.463 internal diameter may be employed in the illustrative example. A bearing having a nominal external diameter of 0.470 inches may be mounted on the assembly pin 86 as illustrated. Thus, if the sleeve 36 were allowed to freely expand with the bearing 62 entered therewithin, the sleeve internal diameter would increase to 0.470 inches and its external diameter would increase to 0.470 plus 0.028 (twice wall thickness) or to 0.498 inches. With a 0.494 inch bore a 0.004 press fit will thus be provided. That is, the sleeve will be urged into press fit engagement with the bore 34 by the axial entry of the bearing 62 within the sleeve.

As stated, the assembly pin 86 controls the internal diameters of the bearing 62 and the seal 60. As illustrated, the gasket 64 is disposed about the pin and may be readily urged downwardly for engagement with the end flange 42 on the sleeve 36. The seal 60 is mounted on the pin and rests upon a small shoulder 92 and resides about a pin portion 94 of predetermined diameter. The diameter of the portion 94 is slightly smaller than the internal diameter of the seal 60 but only as required to permit the subsequent withdrawal of the pin from within the seal, FIG. 8, said diameter being predetermined to provide a relatively tight fit of the seal thereabout and to thus establish and maintain the desired concentricity of the seal 60 and bearing 62.

The external diameter of the seal 60 is shown in FIG. 6 as being somewhat less than that of the bearing 62 so as to provide for the free downward passage of the seal 60 within the sleeve 36 to the reduced diameter portion 38 thereof. On reaching the reduced diameter portion 38, the seal 60 is engaged therewith in a press fit by the downward urging of the bearing 62, in turn urged downwardly by ram member 96 in FIG. 7. As will be apparent, the reduced diameter portion 38 of the sleeve lacks external constraint and is free to expand uniformly or otherwise deform as required to accomodate nonconcentricities and to permit the pin 86 to establish the required precise concentricity of the internal opening of the seal 60 with the internal opening in the bearing 62.

The diameter of the portion 98 of the assembly pin 86 residing within the bearing 62 in FIG. 6 is preferably slightly larger than the desired final internal diameter of the bearing 62. That is, the bearing 62, formed of sintered bronze or the like, is relatively soft and deformable so as to be compressed as it is urged downwardly within the confined portion of the sleeve 36. The internal diameter of the bearing 62 may thus be reduced slightly with the wall of the central opening in the bearing tightly engaging the pin portion 98 so as to be dimensioned or sized thereby. When the pin 86 is withdrawn downwardly as in FIG. 8, the wall of the internal opening in the bearing 62 may expand slightly inwardly and this can be provided for in proper sizing of the pin. In the illustrative example above, the bearing 62 with a 0.470 inch external diameter is provided with an initial internal diameter in the range 0.1878 to 0.1882 inches. The desired final dimension of the internal opening in the bearing 62 is in the diameter range between 0.1875 and 0.1877 inches. The inward expansion of the wall of the bearing opening or internal diameter reduction on withdrawal of the pin 86 is found to be approximately 0.0002 inches. Accordingly, the dimension of the pin portion 98 should be a diameter in the range 0.1877 to 0.1878 inches.

In the foregoing example, dimensioning or sizing of the bearing internal diameter is precisely controlled by the pin 86 and with precise concentricity or coaxial relationship of the pin portions 94 and 98, the resulting bearing assembly as in FIG. 8 exhibits a corresponding precise dimensional relationship and precise concentricity of bearing and seal. The FIG. 7 and 8 steps of the method will be apparent from the schematic illustration thereof with the ram 96 descending and urging the seal and bearing into press fit engagement with the sleeve. The bearing simultaneously urges the sleeve into press fit engagement with the wall of the bore in the annular element, and is simultaneously sized at its internal diameter as required, precise concentricity being maintained throughout. The ram 96 and pin 86 are thereafter withdrawn in opposite directions as illustrated in FIG. 8 and the assembly procedure is complete.

Figure 3:
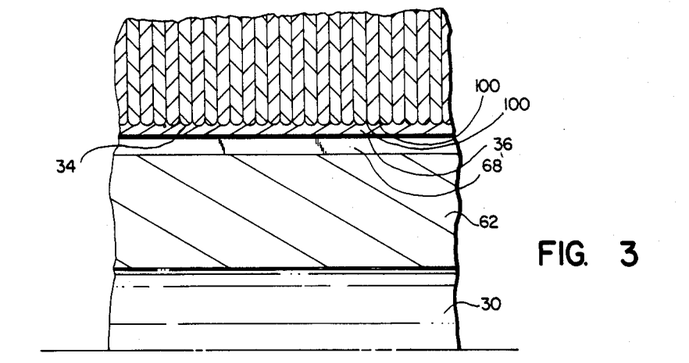
FIG. 3 is a further enlarged fragmentary section showing a portion of a bore adjacent rotor laminations and a portion of an adjacent sleeve and bearing forming a part of the bearing and seal assembly.

A further feature of the press fit engagement of the sleeve 36 within the bore 34 of the annular member 22 is illustrated in FIG. 3. The wall of the bore 34 may have significant irregularities as for example in the case of a rotor of laminated construction. Thus, small depressions in the wall may exist as at 100, 100 in FIG. 3. When the soft deformable sleeve 36 is urged outwardly by the press fit of the bearing 62 therewithin the periphery of the sleeve is slightly expanded into or peripherally conforms with the depressions whereby to secure the sleeve against axial movement relative to the bore wall. This condition is effective on final assembly to prevent relative sleeve movement and, it should be noted, is also effective during the press fitting operation. That is, as the bearing is entered within the sleeve, FIGS. 6, 7, the peripheral surface of the sleeve grips the depressions between laminations in the rotor wall and the sleeve is thus held against unintended or accidental downward dislodgement as might otherwise result from the downward bearing movement therewithin. Such downward dislodgement might result in deformation of the upwardly projecting portion of the sleeve 36 beyond the end of the bore wall 34. For example, with a deformable and relatively fragile sleeve, the O-ring seat at the upper portion of the sleeve might be otherwise flared downwardly or deformed so as to result in an ineffective seat configuration.

Figure 9:
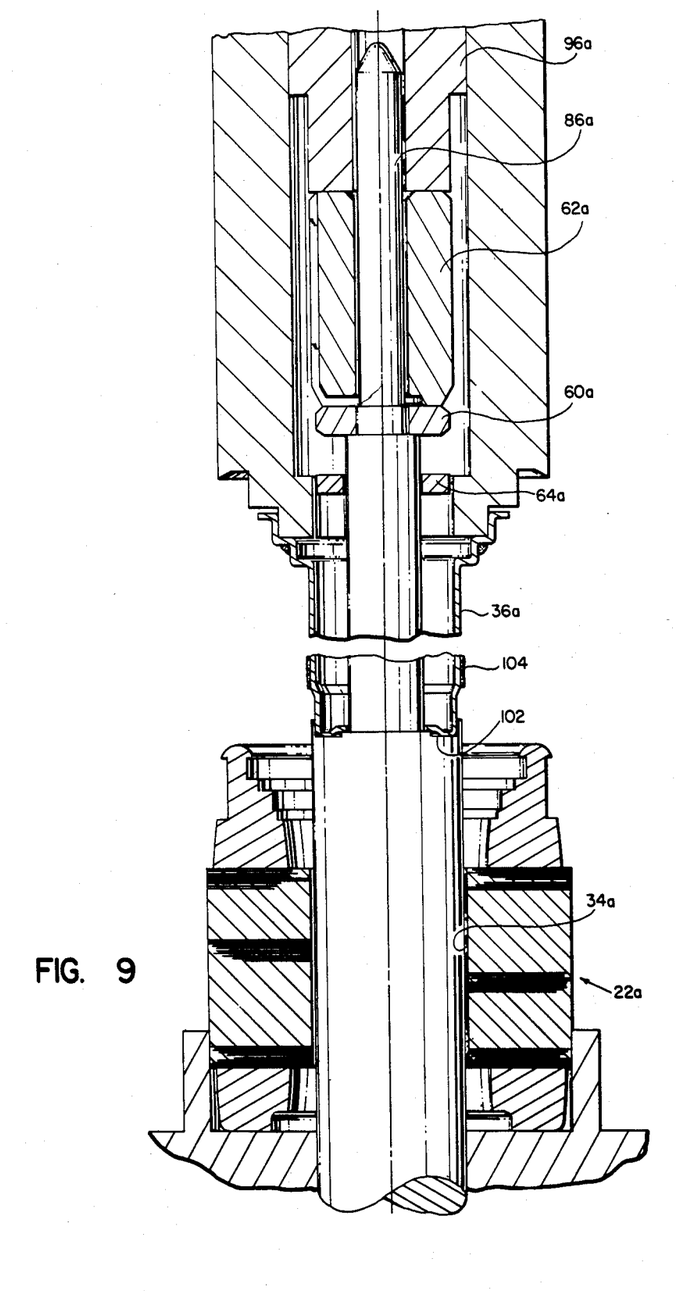
FIG. 9 is a somewhat schematic sectional view illustrating an alternative method of assembly with the various parts in preliminary and unassembled positions.
Figure 10:
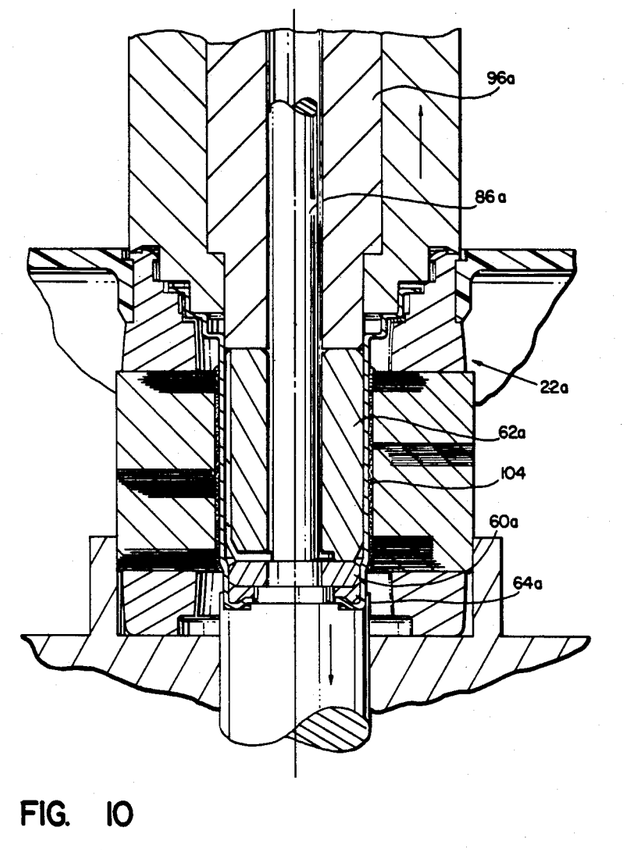
FIG. 10 is a somewhat schematic sectional view similar to FIG. 9 but showing the various parts of the bearing and seal assembly in assembled positions within the bore of the rotor of an electric motor.

In FIGS. 9 and 10, an alternative form of the assembly method is illustrated wherein the sleeve 36a is adhesively secured within bore 34a of annular member 22a. In this form of the method, the elements including the annular member 22a, the sleeve 36a, the gasket 64a, seal 60a, bearing 62a and assembly pin 86a are aligned axially as in the embodiment of the method described above. It will be noted, however, that the sleeve is positioned externally of the bore 34a and held by an annular shoulder 102 on a lower portion of the pin 86a. In this position of the sleeve 36a, adhesive may be applied externally as indicated at 104, and the gasket, seal, and bearing may be urged downwardly for press fit engagement of the seal and bearing within the sleeve 36a. Ram 96a operates with the pin 86a held in the FIG. 9 position and with the upper portion of the pin moving downwardly within the lower portion thereof which defines the annular seat 102. When the bearing, seal, and gasket have been assembled within the sleeve 36a, continuing downward ram movement urges the assembled sleeve, bearing, seal, and gasket to the FIG. 10 position with the lower pin portion moving downwardly to the FIG. 10 position. On full withdrawal of the ram and pin, and on curing of the adhesive, the assembly is secured within the annular element 22a as required.

As will be apparent, the sleeve 36a is capable of free uniform expansion and other deformation in the FIG. 9 position. Thus, the assembly pin controls concentricity of elements but does not serve as a dimensioning or sizing element for the internal diameter of the bearing 62a. The bearing in this instance is provided with a precise internal diameter as required prior to assembly and bearing compression is avoided during the assembly operation. Precise concentricity or coaxial relationship of the elements is nevertheless established and maintained as required. Any non-concentricity encountered is accomodated by expansion or deformation of the sleeve 36a as in the case of the FIG. 6–8 embodiment.

From the foregoing it will be apparent that an improved bearing and seal assembly and an associated assembly method have been provided. The assembly method shows a high degree of ease and convenience and is conducive to manufacture at economic advantage. The resulting bearing and seal assembly is highly efficient and dependable in long service life.

We claim:

1. A bearing and seal assembly for use in an electric motor or the like having a major annular element with a through bore adapted to receive the bearing and seal assembly and a shaft therewithin; said bearing and seal assembly comprising a soft deformable and smooth thin walled sleeve disposed in and secured to the wall of the bore, said sleeve having one end portion peripherally unrestrained by the bore wall at one end of the latter, a sleeve bearing disposed in the sleeve and in press fit engagement therewithin for retention therewithin, and an annular seal disposed in end-to-end relationship with the bearing and in the unrestrained end portion of the sleeve, said annular seal being in press fit engagement with the sleeve at its unrestrained end portion and having its shaft opening held in precise coaxial relationship with the shaft opening of the adjacent bearing by the sleeve end portion, the latter being slightly expanded by the press fit of the seal therewithin and accomodating any non-concentricity of parts whereby to maintain said precise coaxial relationship of said shaft openings.

2. A bearing and seal assembly as set forth in claim 1 wherein the wall of the bore in the annular motor element has significant irregularities, and wherein the soft deformable sleeve is pressed at least partially into the depressions in such irregularities by the press fit of the bearing within the sleeve.

3. A bearing and seal assembly as set forth in claim 1 wherein said unrestrained portion of said sleeve projects beyond the end of the bore wall at one end thereof.

4. A bearing and seal assembly as set forth in claim 1 wherein the sleeve is adhesively secured within the bore of the annular motor element.

5. A bearing and seal assembly as set forth in claim 3 wherein at least on radially outwardly extending lubricant opening is defined between the bearing and the adjacent seal.

6. A bearing and seal assembly as set forth in claim 1 wherein a radially inwardly projecting flange is integrally formed at the end of said unrestrained end portion of the sleeve, and wherein a gasket is secured between said flange and said seal for the prevention of lubricant leakage radially outwardly of the seal and axially outwardly beyond the gasket.

7. A bearing and seal assembly as set forth in claim 6 wherein the sleeve has a portion which projects beyond the bore wall at an end opposite said one end portion and which is of enlarged diameter to form an O-ring seat within a similarly projecting portion of the annular motor element, and wherein an O-ring is provided and engaged with said seat.

8. A bearing and seal assembly as set forth in claim 7 wherein a closure cap is adapted for snap engagement with said projecting portion of said annular motor element and has an annular inwardly projecting flange engageable with the O-ring to seal thereagainst and to provide a lubricant chamber adjacent the end of the bearing and within the projecting portion of the sleeve.

9. A bearing and seal assembly as set forth in claim 7 wherein said projecting end portion of the sleeve is provided with a plurality of further axially projecting small flexible hook members, wherein a cap member is provided for engagement with said small members and has an annular flange engageable with the O-ring to provide a lubricant chamber adjacent the end of the bearing and within the sleeve.

* * * * *